E. W. SERRELL.
SPRING CONNECTION FOR VEHICLES.
APPLICATION FILED JUNE 25, 1912.
1,167,940.
Patented Jan. 11, 1916.
2 SHEETS—SHEET 2.
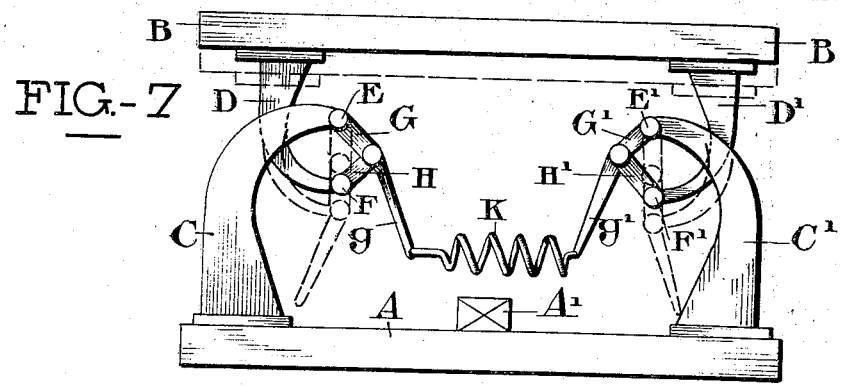
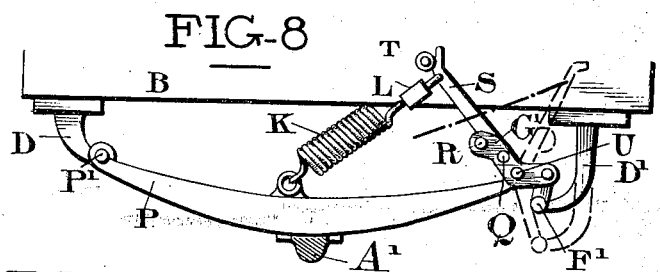
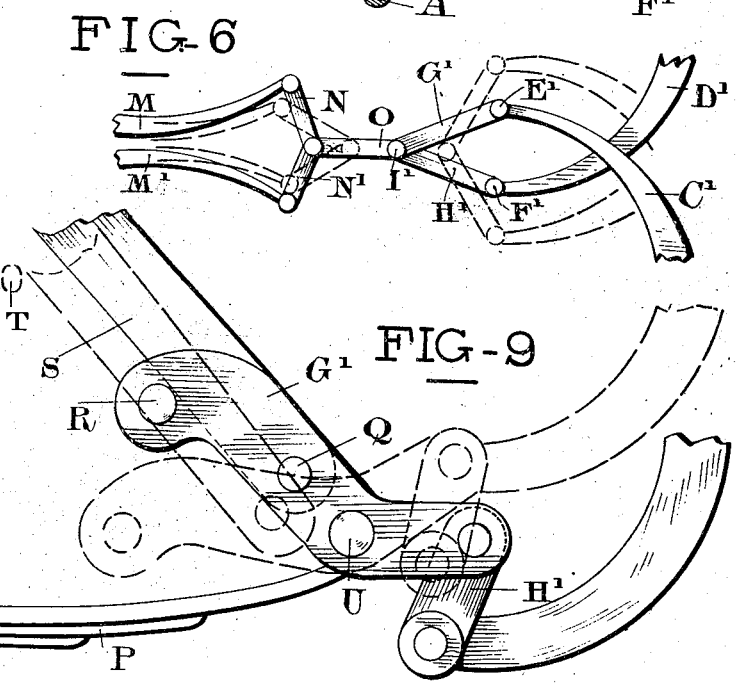
Witnesses:
Edw. Paul Serrell.
Harrison Serrell.
Inventor:
Edward William Serrell
by Wm. J. Dolan, atty

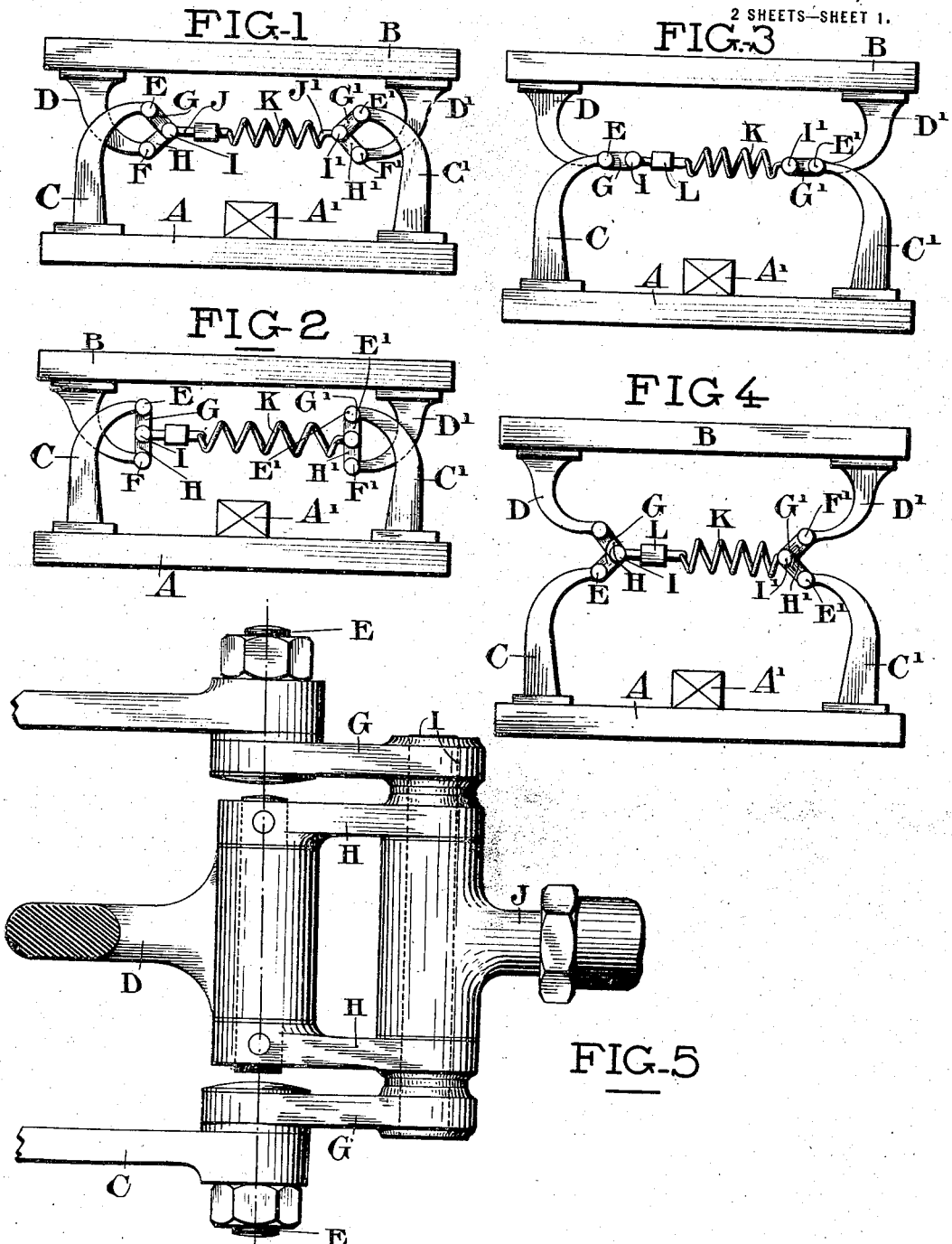

UNITED STATES PATENT OFFICE.

EDWARD WILLIAM SERRELL, OF CHABEUIL, FRANCE.

SPRING CONNECTION FOR VEHICLES.

1,167,940.  Specification of Letters Patent. Patented Jan. 11, 1916.

Application filed June 25, 1912. Serial No. 705,740.

*To all whom it may concern:*

Be it known that I, EDWARD WILLIAM SERRELL, a citizen of the United States, at present residing at Chabeuil, Drôme, France, (whose post-office address is Pearl River, Rockland county, New York,) have invented a new and useful Improvement in Spring Connections for Vehicles, of which the following is a specification.

This invention relates to vehicle springs.

The primary object of the invention is to provide such an arrangement and coaction of components of a vehicle suspension structure that the action of such components (or at least of certain of them) may automatically be modified in accordance with the relative position which such components may assume under different conditions of use.

Another object of the invention is to provide a structure in which, when the relative position of said components is varied—as a result, for instance, of changes of load or inequalities of the road-surface—more effective action of certain of the components is rendered possible, so that the leverage of other of the components,—the springs, say—may thereby be automatically varied in order to cause the various components to rearrange themselves and become more sensitive whereby the structure in general is caused to absorb shocks, etc., and automatically to readjust the effective resistant action of such spring not only to the varying weight carried, but, at the same time, to render it capable of performing its designed function under extreme conditions, such as the encountering of deep depressions in or high elevations of the road-surface.

Another object of the invention is so to aggroup the parts that danger of breaking thereof is reduced to a minimum; and, if they do break, then the structure will still operate to perform its function, though, perhaps, less effectually.

The invention resides in certain novel parts, aggroupments and improvements, all as herein shown and described.

In the acompanying drawings, I have illustrated various embodiments of the invention, and the same will serve in connection with the following description to explain its general and underlying principles:

In these drawings: Figure 1 is a view in elevation, and more or less diagrammatic, of a structure embodying one form of device which I contemplate; Figs. 2, 3 and 4 are similar views, showing the parts in the different positions which they assume in action and under changing conditions of load, etc.; Fig. 5 is a view in plan, somewhat fragmentary, but enlarged to show the relation of the aggrouped components of the structure; Fig. 6 is also a fragmentary view, in elevation, of a modified form of structure, and showing the normal position of the parts in full lines and, in dotted lines, the shifted position thereof resulting from a change of the load-condition, or the like; Fig. 7 is a view similar to Fig. 1 but of a modified form of structure; Fig. 8 is a diagrammatic view in elevation of still another modification; and Fig. 9 is a fragmentary view illustrative (on a larger scale) of different positions of the parts of the structure shown in Fig. 8.

Referring to the drawings, and to Figs. 1 to 5 thereof, the reference-character A designates a supporting-component adapted to be connected or otherwise attached to any appropriate part of a vehicle: In this instance, it is shown as carried by an axle A'.

Preferably and as shown, the support A is aarranged in operative juxtaposition to the frame (which is represented by B) of the vehicle, and which also constitutes a supporting component.

Upstanding from the support A are bifurcated standards or posts C C and C' C', of any suitable dimensions and, preferably and as shown, arranged in spaced relation to constitute sustaining instrumentalities for certain structure now to be described:

Depending from the frame B and occupying a normal position between the standards C C and C' C', are hangers D and D', there being one of these at each side of the axle A'. These constitute lever-sustaining components.

The contiguous ends of the standards and hangers are provided, each, with an axis denoted, at one side by the reference-characters E and F, respectively, and at the other by E' and F'. These constitute efficient fulcra for a lever-system now to be described. At the fulcra E and E' are suitably attached a pair of upper levers G G and G' G' of said system; and, likewise at F and F' are attached a pair of lower levers H H and H' H'. Normally, these two sets of levers bear an angular relation to each, and the levers H and H' are preferably disposed normally between the levers G and G', and these sets are fulcrumed on an axis, marked I at one one side and I' at the other—which is common to both sets, as shown. Also fulcruming on the axis I is a spring-attaching member J; and, to this member is connected a resilient controlling-component which, in this instance, is shown in the form of a spring K, and which at its opposite end is connected to an attaching-member J' which fulcrums on the axis I'. For adjusting the tension of this spring and adjusting the relation of the parts, a device (in the form of a nut L) may be provided which in this instance is shown as interposed between the spring K and the attaching member J. The action and coaction of these parts will be manifest: The weight borne by the frame B tends to rock the two sets of levers on their respective axes (from the position shown in Fig. 1) away from each other and toward the vertical position shown in Fig. 2. Naturally, this movement of the levers effects a tensioning of the spring K so that its tendency then is to draw the levers back toward a horizontal position, as shown in Fig. 3. Necessarily, when the weight on the supported parts—or a sudden upward or downward movement of the support—effects a change of relation between the frame B and the support A, the lever-system is actuated and the spring K tensioned, and, obviously, the extent of actuation of the parts determines the degree of tension (if any) of the spring. A condition of equilibrium, so to speak, is dependent upon the extent of tension on the spring and the weight of the supported parts. If the weight and load remain the same and the equilibrium is established, then it would be disturbed whenever the relation of the frame B and support A is changed by reason of a change in any of the conditions mentioned. Even a slight shock will change that relation, and thereupon the lever-system becomes active to transfer the movement or shock to the resilient-component K, which component, as aforementioned, is influenced by action of that system. In this way, the structure readily and smoothly absorbs the shock.

If the load, that is to say, the total weight carried by the frame B, is increased, the levers are caused to rock on their respective fulcra and assume a new position of equilibrium, and, in consequence, the tension or stress on the resilient component K is increased, though this increase is not necessarily in direct proportion to the increase of the load, for the reason that the levers will then have assumed a different angle.

If, as a result of a rather extreme shock imposed on the structure, the levers are moved toward a straight line, it is evident that the effective action of the spring is rendered even greater. But, no matter how great may be the shock communicated to the parts, the levers will never entirely overcome the action of the spring and be drawn into a straight vertical line, in prolongation one of the other. Hence, it becomes clear that the efficiency of the spring increases with the increase of its tension and that its effective resistance and its control of the parts increase very rapidly as the angle between the levers increases. In the event of a shock operating to relieve the levers from the weight of the frame B, they will be drawn by the spring K to the position shown in Fig. 3: In this position, the tension on the spring is at a minimum. If, now, this position is passed—as a result, for instance, of a rebound—so that the levers move to assume the position illustrated in Fig. 4, the spring will again be subjected to an increasing tension because the levers will have moved beyond the centers of oscillation. Thereupon, the spring will act as efficiently in counteracting the rebound as when carrying the load. It, therefore, follows that, in addition to being sensitive to all minor shocks and jars, the structure (including the spring) is very efficient for the heaviest of shocks; and, moreover, it can never be actuated beyond a safe and yielding action. Being self-adjusting to varying conditions, it has the important capacity of adapting itself to meet those conditions, whatever they are and whether great or minor. Moreover, should the spring K fracture or suddenly weaken, the levers themselves will then adjust themselves to an approximately alined position and efficiently become the support between the vehicle-body and wheels.

In Fig. 6, I have shown a modification of the structure just described: This form is well adapted for the situation where the extent of movement of the supported parts must be great and the action of the resilient controlling-component correspondingly short: In this instance, in lieu of the spring K, employed in the first-mentioned embodiment, springs M and M' are employed; and connected to these is another set of three levers N, N' and O, which are jointed to levers G' and H' adapted to fulcrum on the standard C' and hanger D': In this form of structure, a position of equilibrium is indicated in Fig. 6 by the full lines, while the position of maximum tension is denoted by the dotted lines.

When the general structure of a vehicle will permit the employment of springs of relatively great elongation to reduce the stresses and consequent friction, I may utilize the modified form of structure illustrated in Fig. 7, wherein the levers G, G' are of considerable length to provide the portions g, g', respectively, and to which portions, at their lower extremities, is attached the spring K. The axes of these levers—of toggle-lever form—then serve as fulcra also.

It will now be obvious that, by proper adaptation and proportioning of the lever-components, by their initial positioning at predetermined angular relation, and by provision of the required stiffness of the springs, it is possible to obtain any desired action, within reasonable limits, of my improved spring system.

In special instances, it may be necessary or desirable to augment the action of the parts by the introduction of additional instrumentalities; and, in Figs. 8 and 9, I have exemplified a modified form of structure in which there is combined with my invention a leaf-spring P of ordinary construction, and the stiffness of which may be of any required degree because the necessary flexibility will be a necessary incident of the components combined therewith constituting the salient features of my invention. In this instance, the construction includes the axle A' and the aforementioned spring P which is, preferably and as shown, attached at one of its ends, at P', to the pendant hanger D secured to the vehicle-frame B, and at the other end is jointed (at U) to the levers G' which, in this form, are of the bell-crank type, and to the lower ends of which are attached levers H'. These latter levers fulcrum on the lower ends of the hangers D'. Pivoted at Q, intermediately of the upper arm of the lever G', is another lever S, having a fulcrum on a stop R, provided at the same end of G'. The spiral spring K is attached to the free end of the lever S, at a point which may be varied at will, and to the leaf-spring P, preferably on the opposite side of the axle from where the lever G' is located. With such an arrangement of the parts, the best results are usually obtainable when the position and tension of the spring K are such that the lever G' will remain in nearly a horizontal plane under the ordinary weight of the vehicle when unloaded. When, however, the parts are sustaining a full load, the position of equilibrium will have shifted so that the lever G' will be positioned at an angle of approximately 35° to 40° from the horizontal. Then, in the event of a heavy shock, the action of the spring will be such that said lever G' will assume a position nearly vertical, as indicated by dotted line in Fig. 8.

In Fig. 9 are shown the relative positions of the various components of the structure when the vehicle-body rebounds: Then, the lever S engages a stop T suitably mounted on the vehicle-frame B and the upward movement of the body is nicely controlled by the springs and their coaction with the levers as they rock on their axes, until the parts assume the position indicated in dotted lines, in the latter-named figure.

It is obvious that my structure may be applied to any other appropriate part of the vehicle than that already referred to, as for instance, to carriage-seats. It may also be applied to bicycle-saddles.

From the foregoing it will be understood that the various parts and devices, singly and in their coöperation, contribute to effect a reliable control of the vehicle body no matter what may be the inequalities of the road-surface; and that a structure has been provided which realizes the objects of the invention and the advantages therein as herein set forth, together with other objects and advantages.

The invention in its broader aspects is not limited to the particular construction shown, nor in fact to any particular construction by which it has been or may be carried into effect, except in so far as elements are hereinbefore specified as essential; and obviously many changes may be made in the construction without departing from the main and underlying principle of the invention and without sacrificing its chief advantages.

What I claim is:

1. The combination with the frame and running gear of a vehicle, of supports projecting oppositely therefrom, toggle links jecting oppositely said supports capable of alinement between said supports capable of alinement to keep the frame suspended in properly spaced relation above the running gear, and a resilient member operating normally to draw said links into an angular position relatively to the plane of alinement.

2. The combination with normally lapped supports projecting from the running gear and frame of a vehicle respectively, of toggle links pivotally connected to said supports, said links being capable of substantial alinement, and a spring drawing upon the toggle joint of said links.

3. A resilient suspension device for vehicles including, in combination, a plurality of supports rising from the running gear, coacting supports projecting oppositely thereto from the vehicle frame, intermediate toggle links pivotally connected to the opposite supports so as to form suspending means operating therewith in like directions, and a spring positioned to draw upon said links at their toggle-joints.

4. In a resilient suspension device for vehicles, the combination of in-curved posts standing in opposed relation upon the running gear, correspondingly curved hangers projecting from the vehicle frame in position to lap over said posts by crossing their respective curves, toggle links pivotally engaging contiguous posts and hangers, and an intermediate spring tensioned by the toggle-joints of said links, operating normally to draw the latter out of said curves.

5. A spring-structure for vehicles comprising, in combination, a supporting member located transversely with relation to the axle of the vehicle, posts mounted upon the opposite ends thereof, hangers projecting from the vehicle frame in position to lap over said posts under normal stress of the load on said frame, or by ascent of the supporting member resulting from shocks thereon, and to rise above the posts at rebound, toggle levers having pivotal connections with the adjacent posts and hangers, and a tensioning spring attached to said levers on opposite sides of the axle.

6. In a spring structure for vehicles, the combination of a pair of posts supported from the running gear, a pair of hangers depending from the vehicle frame in position each to overlap one of said posts, toggle levers respectively pivoted to the lapped post and hanger in the corresponding pairs, and a spring operatively connected at its opposite ends to extensions of said toggle levers.

7. The combination with normally lapped and substantially rigid supports projecting from the running gear and frame of a vehicle respectively, of toggle links pivotally connected to said supports, and a resilient member drawing upon the toggle joint of said links.

8. A resilient suspension device for vehicles including, in combination, a plurality of supports rising from the running gear, coacting supports projecting oppositely thereto from the vehicle frame, intermediate toggle links pivotally connected to the opposite supports, and a resilient member positioned to draw upon said links at their toggle joints.

In testimony whereof I affix my signature in presence of two witnesses.

EDWARD WILLIAM SERRELL.

Witnesses:
 GUILLAUME PIOCHE,
 MARIN VACHON.